(12) United States Patent
Ezell et al.

(10) Patent No.: US 8,813,845 B2
(45) Date of Patent: *Aug. 26, 2014

(54) POLYMERIC ADDITIVES FOR ENHANCEMENT OF TREATMENT FLUIDS COMPRISING VISCOELASTIC SURFACTANTS AND METHODS OF USE

(75) Inventors: Ryan G. Ezell, Spring, TX (US); Ryan Van Zanten, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 285 days.

This patent is subject to a terminal disclaimer.

(21) Appl. No.: 12/608,738

(22) Filed: Oct. 29, 2009

(65) Prior Publication Data

US 2011/0053812 A1 Mar. 3, 2011

Related U.S. Application Data

(63) Continuation-in-part of application No. 12/551,334, filed on Aug. 31, 2009.

(51) Int. Cl.
*C09K 8/12* (2006.01)
*C09K 8/035* (2006.01)
*C09K 8/68* (2006.01)

(52) U.S. Cl.
CPC . *C09K 8/035* (2013.01); *C09K 8/12* (2013.01); *C09K 8/68* (2013.01); *C09K 2208/30* (2013.01)
USPC ............. 166/305.1; 166/308.1; 166/275

(58) Field of Classification Search
USPC ............................ 166/275, 270.1
See application file for complete search history.

(56) References Cited

U.S. PATENT DOCUMENTS

| | | | |
|---|---|---|---|
| 2,779,418 A | 1/1957 | Garst | |
| 2,935,129 A | 5/1960 | Allen et al. | |
| 4,266,610 A * | 5/1981 | Meister | 166/270.1 |
| 4,695,389 A | 9/1987 | Kubala | |
| 4,725,372 A | 2/1988 | Teot et al. | |
| 5,030,366 A | 7/1991 | Wilson et al. | |

(Continued)

FOREIGN PATENT DOCUMENTS

| | | |
|---|---|---|
| CA | 2575501 A1 | 6/2006 |
| CA | 2669627 A1 | 6/2008 |

(Continued)

OTHER PUBLICATIONS

Aleman et al.; Definitions of Terms Relating to the Structure and Processing of Sols, Gels, Networks, and Inorganic-Organic Hybrid Materials; IUPAC Recommandations 2007, Pure Appl. Chem., vol. 79, No. 10, pp. 1801-1829; XP-002603495.

(Continued)

*Primary Examiner* — Zakiya W Bates
*Assistant Examiner* — Silvana Runyan
(74) *Attorney, Agent, or Firm* — McDermott Will & Emery LLP; Craig W. Roddy

(57) ABSTRACT

Polymeric additives used with viscoelastic surfactants, fluids comprising such additives and viscoelastic surfactants, and associated methods of use, are provided. In one embodiment, the methods comprise: providing a treatment fluid that comprises an aqueous base fluid, a viscoelastic surfactant, and an amphiphilic polymer, the amphiphilic polymer comprising a hydrophobic component, and a hydrophilic component comprising at least 15 monomer units; and introducing the treatment fluid into at least a portion of a subterranean formation.

13 Claims, 4 Drawing Sheets

(56) References Cited

U.S. PATENT DOCUMENTS

| | | | |
|---|---|---|---|
| 5,309,999 | A | 5/1994 | Cowan et al. |
| 5,314,022 | A | 5/1994 | Cowan et al. |
| 5,361,842 | A | 11/1994 | Hale et al. |
| 5,373,901 | A | 12/1994 | Norman et al. |
| 5,515,921 | A | 5/1996 | Cowan et al. |
| 5,551,516 | A | 9/1996 | Norman et al. |
| 5,663,123 | A | 9/1997 | Goodhue, Jr. et al. |
| 5,804,535 | A | 9/1998 | Dobson et al. |
| 5,879,699 | A | 3/1999 | Lerner |
| 5,979,555 | A | 11/1999 | Gadberry et al. |
| 5,996,692 | A * | 12/1999 | Chan et al. ........... 166/263 |
| 6,063,737 | A | 5/2000 | Haberman et al. |
| 6,063,738 | A | 5/2000 | Chatterji et al. |
| 6,239,183 | B1 | 5/2001 | Farmer et al. |
| 6,283,213 | B1 | 9/2001 | Chan |
| 6,435,277 | B1 | 8/2002 | Qu et al. |
| 6,444,316 | B1 | 9/2002 | Reddy et al. |
| 6,506,710 | B1 | 1/2003 | Hoey et al. |
| 6,527,051 | B1 | 3/2003 | Reddy et al. |
| 6,547,871 | B2 | 4/2003 | Chatterji et al. |
| 6,554,071 | B1 | 4/2003 | Reddy et al. |
| 6,831,043 | B2 | 12/2004 | Patel et al. |
| 6,881,709 | B2 | 4/2005 | Nelson et al. |
| 6,908,888 | B2 | 6/2005 | Lee et al. |
| 7,060,661 | B2 | 6/2006 | Dobson, Sr. et al. |
| 7,081,439 | B2 | 7/2006 | Sullivan et al. |
| 7,084,095 | B2 | 8/2006 | Lee et al. |
| 7,159,659 | B2 | 1/2007 | Welton et al. |
| 7,238,648 | B2 | 7/2007 | Dahayanake et al. |
| 7,279,446 | B2 | 10/2007 | Colaco et al. |
| 7,293,609 | B2 | 11/2007 | Dealy et al. |
| 7,299,874 | B2 | 11/2007 | Welton et al. |
| 7,303,019 | B2 | 12/2007 | Welton et al. |
| 7,320,952 | B2 | 1/2008 | Chen et al. |
| 7,341,980 | B2 | 3/2008 | Lee et al. |
| 7,351,681 | B2 | 4/2008 | Reddy et al. |
| 7,378,378 | B2 | 5/2008 | Chen et al. |
| 7,387,986 | B2 | 6/2008 | Chen et al. |
| 7,387,987 | B2 | 6/2008 | Chen et al. |
| 7,402,549 | B2 | 7/2008 | Chen et al. |
| 7,527,103 | B2 | 5/2009 | Huang et al. |
| 7,547,663 | B2 | 6/2009 | Kirsner |
| 7,858,561 | B2 | 12/2010 | Abad et al. |
| 7,985,718 | B2 | 7/2011 | Steinbrenner et al. |
| 8,053,396 | B2 | 11/2011 | Huff et al. |
| 8,148,303 | B2 | 4/2012 | Van Zanten et al. |
| 8,618,026 | B2 | 12/2013 | Ezell et al. |
| 2002/0193257 | A1* | 12/2002 | Lee et al. ........... 507/200 |
| 2003/0054962 | A1 | 3/2003 | England et al. |
| 2003/0134751 | A1 | 7/2003 | Lee et al. |
| 2004/0043905 | A1 | 3/2004 | Miller et al. |
| 2004/0211558 | A1 | 10/2004 | Morales et al. |
| 2005/0107265 | A1 | 5/2005 | Sullivan et al. |
| 2005/0107503 | A1 | 5/2005 | Couillet et al. |
| 2005/0119401 | A1 | 6/2005 | Bavouzet et al. |
| 2005/0155762 | A1 | 7/2005 | Chen et al. |
| 2005/0194145 | A1 | 9/2005 | Beckman et al. |
| 2005/0252659 | A1 | 11/2005 | Sullivan et al. |
| 2006/0046937 | A1 | 3/2006 | Fu et al. |
| 2006/0081372 | A1 | 4/2006 | Dealy et al. |
| 2006/0111248 | A1 | 5/2006 | Lee et al. |
| 2006/0128597 | A1* | 6/2006 | Chen et al. ........... 510/490 |
| 2006/0183646 | A1 | 8/2006 | Welton et al. |
| 2006/0258541 | A1 | 11/2006 | Crews |
| 2007/0012445 | A1* | 1/2007 | Nguyen et al. ........... 166/281 |
| 2007/0032386 | A1* | 2/2007 | Abad et al. ........... 507/201 |
| 2007/0066491 | A1 | 3/2007 | Bicerano et al. |
| 2007/0114022 | A1* | 5/2007 | Nguyen ........... 166/250.1 |
| 2007/0123431 | A1 | 5/2007 | Jones et al. |
| 2007/0215355 | A1* | 9/2007 | Shapovalov et al. ....... 166/305.1 |
| 2007/0281869 | A1* | 12/2007 | Drochon et al. ........... 507/219 |
| 2007/0284103 | A1 | 12/2007 | Dealy et al. |
| 2008/0110618 | A1 | 5/2008 | Quintero et al. |
| 2008/0119374 | A1* | 5/2008 | Willberg et al. ........... 507/209 |
| 2008/0121395 | A1 | 5/2008 | Reddy et al. |
| 2008/0194435 | A1* | 8/2008 | Huff et al. ........... 507/224 |
| 2008/0236823 | A1 | 10/2008 | Willberg et al. |
| 2009/0008091 | A1 | 1/2009 | Quintero et al. |
| 2009/0111716 | A1 | 4/2009 | Hough et al. |
| 2009/0209438 | A1 | 8/2009 | Thieme et al. |
| 2009/0270280 | A1 | 10/2009 | Zhang et al. |
| 2010/0031418 | A1 | 2/2010 | Op't Hof |
| 2010/0056405 | A1* | 3/2010 | Ali et al. ........... 507/240 |
| 2010/0081586 | A1 | 4/2010 | Smith et al. |
| 2010/0081587 | A1 | 4/2010 | van Zanten et al. |
| 2010/0256025 | A1* | 10/2010 | van Zanten et al. ....... 507/240 |
| 2010/0263863 | A1 | 10/2010 | Quintero et al. |
| 2010/0300759 | A1 | 12/2010 | Passade-Boupat et al. |
| 2011/0005773 | A1 | 1/2011 | Dusterhoft et al. |
| 2011/0048716 | A1 | 3/2011 | Ezell |
| 2011/0048718 | A1 | 3/2011 | Van Zanten et al. |
| 2011/0071056 | A1 | 3/2011 | Saini et al. |

FOREIGN PATENT DOCUMENTS

| | | |
|---|---|---|
| CA | 2721973 A1 | 10/2009 |
| CN | 101238193 A | 8/2008 |
| EP | 0 037 699 A2 | 10/1981 |
| EP | 2 085 448 A1 | 8/2009 |
| GB | 2 383 355 A | 6/2003 |
| GB | 2383355 A | 6/2003 |
| GB | 2457151 A | 8/2009 |
| WO | WO 02/070862 A1 | 9/2002 |
| WO | WO02070862 A1 | 9/2002 |
| WO | 03056130 A1 | 7/2003 |
| WO | WO 2009/006251 A1 | 1/2009 |
| WO | WO 2009/030868 A2 | 3/2009 |
| WO | WO2011/023966 A1 | 3/2011 |
| WO | WO 2012/001361 A1 | 1/2012 |
| WO | WO 2012038704 A1 | 3/2012 |

OTHER PUBLICATIONS

International Search Report and Written Opinion for PCT/GB2010/001629 dated Oct. 22, 2010.
International Search Report and Written Opinion for PCT/GB2010/001630 dated Oct. 19, 2010.
International Search Report and Written Opinion for PCT/GB2010/001631 dated Oct. 19, 2010.
Schlumberger, ClearFRAC LT Surfactant Article, Apr. 2005.
Crews et al., New Technology Improves Performance of Viscoelastic Surfactant Fluids, SPE-Drilling & Completion, 23, 41-47, 2008.
Samuel et al., Polymer-Free Fluid for Hydraulic Fracturing, SPE 38622, 1997.
Samuel, et al., A New Solids-Free Non-Damaging High Temperature Lost-Circulation Pill: Development and First Field Applications, SPE 81494, 2003.
Massiera et al., Hairy Wormlike Micelles: Structure and Interactions, Langmuir, 18, 5867-5694, 2002.
Massiera et al., The Steric Polymer Layer of Hairy Wormlike Michelles, Journal of Physics: Condensed Matter, 15, S225-S231, 2003.
Ramos et al., Structure of a New Type of Transient Network: Entangled Wormlike Micelles Bridged by Telechelic Polymers, Macromolecules, 40, 1248-1251, 2007.
Van Zanten, Dissertation, University of California Santa Barbara, pp. 74-143, 2007.
Ingram et al., Enhancing and Sustaining Well Production: Granite Wash, Texas Panhandle, SPE 106531, 2007.
Hellweg, Phase Structures of Microemulsions, Current Opinion in Colloid and Interface, Science 7, 50-56, 2003.
Kunieda et al., Effect of Added Salt on the Maximum Solubilization in an Ionic-Surfactant Microemulsion, Langmuir, 12, 5796-5799, 1996.
Gotch, et al., Formation of Single-Phase Microemulsions in Toluene/Water/Nonionic Surfactant Systems, Langmuir, 24, 4485-4493, 2008.
Welton, et al., Anionic Surfactant Gel Treatment Fluid, Society of Petroleum Engineers, SPE 105815, 2007.

(56) References Cited

OTHER PUBLICATIONS

Cates, et al., "Statics and dynamics of worm-like surfactant micelles," Journal of Phys.: Conens. Matter, 2, 1990, pp. 6869-6892.
Samuel, et al., "Polymer-Free Fluid for Hydraulic Fracturing," SPE 38622, 1997, pp. 553-559.
Samuel, et al., "A New Solids-Free Non-Damaging High Temperature Lost-Circulation Pill: Development and First Field Applications," SPE 81494, 2003, pp. 1-12.
Nagarajan, R., "Molecular Packing Parameter and Surfactant Self-Assembly: The Neglected Role of the Surfactant Tail," Langmuir, 2002, 18, 31-38.
Massiera, et al., "Hairy Wormlike Micelles: Structure and Interactions," Langmuir, 2002, 18, 5687-5694.
Massiera, et al., "The steric polymer layer of hair wormlike micelles," Journal of Phys.: Condens. Matter, 2003, 15, S225-S231.
Croce, et al., "Impacting the Length of Wormlike Micelles Using Mixed Surfactant Systems," Langmuir, 2004, 20, 7984-7990.
Ramos, et al., "Structure of a New Type of Transient Network: Entangled Wormlike Micelles Bridged by Telechelic Polymers," Macromoleculres, 2007, 40, 1248-1251.
Crews, et al., "New Technology Improves Performance of Viscoelastic Surfactant Fluids,"SPE 103118, Mar. 2008, pp. 41-47.
Vanzanten, R.M., "Characterization of the Phase Behavior and Elastic Properties of Surfactant Bilayers," Dec. 2007, 199 pages.
U.S. Appl. No. 60/538,025, filed Jan. 21, 2004, "Additive for Viscoelastic Fluid," 10 pages.
Product Brochure: Thermo Scientific, Pierce Protein Research Products, Brij-35 Detergent (30%) Solution, 1 page, printed Apr. 23, 2009.
Product Brochure: Sigma-Aldrich, IGEPAL CO-630, 1 page, printed Apr. 23, 2009.
Product Brochure: MP Biomedicals, IGEPAL CA-630, 8 pages, printed Apr. 23, 2009.
Israelachvili, J.N., "Fluid-Like Structures and Self-Assembling Systems: Micelles, Bilayers and Biological Membranes," in Intermolecular and Surface Forces, Second Edition, 1992, Academic Press, London, England, pp. 340-450.
Office Action for U.S. Appl. No. 12/551,334 dated Jul. 21, 2011.
International Search Report and Written Opinion for PCT/GB2011/001386 dated Dec. 2, 2011.
Penny et al., "The Application of Microemulsion Additives in Drilling and Stimulation Results in Enhanced Gas Production," 2005 SPE Production and Operations Symposium held in Oklahoma City, OK, SPE 94274.
International Search Report and Written Opinion for PCT/GB2011/001136 dated Sep. 29, 2011.
International Search Report and Written Opinion for PCT/GB2011/000988 dated Oct. 12, 2011.
International Search Report and Written Opinion for PCT/GB2012/000411 dated Jul. 19, 2012.
International Preliminary Report on Patentability for PCT/GB2010/0001629 dated Mar. 15, 2012.
Official Action for EA Application No. 201270354 dated Feb. 13, 2014.
Official Action for Chinese Patent Application CN 201080045743.0 dated Jan. 22, 2014.
Official Action for Canadian Patent Application No. 2,771,700 dated Mar. 18, 2013.
Official Action for Canadian Patent Application No. 2,772,108 dated Mar. 26, 2013.
Official Action for Canadian Patent Application No. 2,772,132 dated May 28, 2013.

\* cited by examiner

POLYMERIC ADDITIVES FOR ENHANCEMENT OF TREATMENT FLUIDS COMPRISING VISCOELASTIC SURFACTANTS AND METHODS OF USE

CROSS REFERENCE TO RELATED APPLICATIONS

This application is a continuation-in-part application of U.S. patent application Ser. No. 12/551,334, entitled "Treatment Fluids Comprising Transient Polymer Networks," filed on Aug. 31, 2009, the entirety of which is herein incorporated by reference, and from which priority is claimed pursuant to 35 U.S.C. §120.

BACKGROUND

The present invention relates to methods and compositions that may be useful in treating subterranean formations, and more specifically, to polymeric additives used with viscoelastic surfactants, fluids comprising such additives and viscoelastic surfactants, and associated methods of use.

Viscosified treatment fluids may be used in a variety of subterranean treatments. As used herein, the term "treatment," or "treating," refers to any subterranean operation that uses a fluid in conjunction with a desired function and/or for a desired purpose. The term "treatment," or "treating," does not imply any particular action by the fluid. Examples of common subterranean treatments include, but are not limited to, drilling operations, pre-pad treatments, fracturing operations, perforation operations, preflush treatments, afterflush treatments, sand control treatments (e.g., gravel packing), acidizing treatments (e.g., matrix acidizing or fracture acidizing), diverting treatments, cementing treatments, and well bore clean-out treatments. For example, in certain fracturing treatments generally a treatment fluid (e.g., a fracturing fluid or a "pad fluid") is introduced into a well bore that penetrates a subterranean formation at a sufficient hydraulic pressure to create or enhance one or more pathways, or "fractures," in the subterranean formation. These cracks generally increase the permeability of that portion of the formation. The fluid may comprise particulates, often referred to as "proppant particulates," that are deposited in the resultant fractures. The proppant particulates are thought to help prevent the fractures from fully closing upon the release of the hydraulic pressure, forming conductive channels through which fluids may flow to a well bore penetrating the formation.

Treatment fluids are also utilized in sand control treatments, such as gravel packing. In "gravel-packing" treatments, a treatment fluid suspends particulates (commonly referred to as "gravel particulates"), and at least a portion of those particulates are then deposited in a desired area in a well bore, e.g., near unconsolidated or weakly consolidated formation zones, to form a "gravel pack," which is a grouping of particulates that are packed sufficiently close together so as to prevent the passage of certain materials through the gravel pack. This "gravel pack" may, inter alia, enhance sand control in the subterranean formation and/or prevent the flow of particulates from an unconsolidated portion of the subterranean formation (e.g., a propped fracture) into a well bore. One common type of gravel-packing operation involves placing a sand control screen in the well bore and packing the annulus between the screen and the well bore with the gravel particulates of a specific size designed to prevent the passage of formation sand. The gravel particulates act, inter alia, to prevent the formation sand from occluding the screen or migrating with the produced hydrocarbons, and the screen acts, inter alia, to prevent the particulates from entering the well bore. The gravel particulates also may be coated with certain types of materials, including resins, tackifying agents, and the like. Once the gravel pack is substantially in place, the viscosity of the treatment fluid may be reduced to allow it to be recovered. In some situations, fracturing and gravel-packing treatments are combined into a single treatment (commonly referred to as "FRAC PAC™" operations). In such "FRAC PAC™" operations, the treatments are generally completed with a gravel pack screen assembly in place with the hydraulic fracturing treatment being pumped through the annular space between the casing and screen. In this situation, the hydraulic fracturing treatment ends in a screen-out condition, creating an annular gravel pack between the screen and casing. In other cases, the fracturing treatment may be performed prior to installing the screen and placing a gravel pack.

Maintaining sufficient viscosity in treatment fluids may be important for a number of reasons. Viscosity is desirable in drilling operations since treatment fluids with higher viscosity can, among other things, transport solids, such as drill cuttings, more readily. Maintaining sufficient viscosity is important in fracturing treatments for particulate transport, as well as to create or enhance fracture width. Particulate transport is also important in sand control treatments, such as gravel packing. Maintaining sufficient viscosity may be important to control and/or reduce leak-off into the formation, improve the ability to divert another fluid in the formation, and/or reduce pumping requirements by reducing friction in the well bore. At the same time, while maintaining sufficient viscosity of a treatment fluid often is desirable, it also may be desirable to maintain the viscosity of the treatment fluid in such a way that the viscosity may be reduced at a particular time, inter alia, for subsequent recovery of the fluid from the formation.

To provide the desired viscosity, polymeric gelling agents commonly are added to the treatment fluids. The term "gelling agent" is defined herein to include any substance that is capable of increasing the viscosity of a fluid, for example, by forming a gel. Examples of commonly used polymeric gelling agents include, but are not limited to guar gums and derivatives thereof, cellulose derivatives, biopolymers, and the like. The use of polymeric gelling agents, however, may be problematic. For instance, these polymeric gelling agents may leave an undesirable gel residue in the subterranean formation after use, which can impact permeability. As a result, costly remedial operations may be required to clean up the fracture face and proppant pack. Foamed treatment fluids and emulsion-based treatment fluids have been employed to minimize residual damage, but increased expense and complexity often have resulted.

To combat perceived problems associated with polymeric gelling agents, some surfactants have been used as gelling agents. It is well understood that, when mixed with an aqueous fluid in a concentration above the critical micelle concentration, the molecules (or ions) of surfactants may associate to form micelles. The term "micelle" is defined to include any structure that minimizes the contact between the lyophobic ("solvent-repelling") portion of a surfactant molecule and the solvent, for example, by aggregating the surfactant molecules into structures such as spheres, cylinders, or sheets, wherein the lyophobic portions are on the interior of the aggregate structure and the lyophilic ("solvent-attracting") portions are on the exterior of the structure. These micelles may function, among other purposes, to stabilize emulsions, break emulsions, stabilize a foam, change the wettability of a surface, solubilize certain materials, and/or reduce surface tension. When used as a gelling agent, the molecules (or ions) of the surfactants used associate to form micelles of a certain micellar structure (e.g., rodlike, wormlike, vesicles, etc., which are referred to herein as "viscosifying micelles") that, under certain conditions (e.g., concentration, ionic strength of the fluid, etc.) are capable of, inter alia, imparting increased viscosity to a particular fluid and/or forming a gel. Certain viscosifying micelles may impart increased viscosity to a fluid such that the fluid exhibits viscoelastic behavior (e.g., shear thinning properties) due, at least in part, to the association of the surfactant molecules contained therein. As used herein, the term "viscoelastic surfactant fluid" refers to fluids that exhibit or are capable of exhibiting viscoelastic behavior due, at least in part, to the association of surfactant molecules contained therein to form viscosifying micelles.

However, the use of surfactants as gelling agents may be problematic in several respects. In certain applications, large quantities of viscoelastic surfactants may be required to impart the desired rheological properties to a fluid. Certain viscoelastic surfactants may be less soluble in certain fluids, which may impair the ability of those surfactants to form viscosifying micelles. Viscoelastic surfactant fluids also may be unstable at high temperatures and/or in high salt concentrations due to, among other things, the tendency of high salt concentrations to "screen out" electrostatic interactions between viscosifying micelles.

SUMMARY

The present invention relates to methods and compositions that may be useful in treating subterranean formations, and more specifically, to polymeric additives used with viscoelastic surfactants, fluids comprising such additives and viscoelastic surfactants, and associated methods of use.

In one embodiment, the present invention provides a method comprising: providing a treatment fluid that comprises an aqueous base fluid, a viscoelastic surfactant, and an amphiphilic polymer, the amphiphilic polymer comprising a hydrophobic component, and a hydrophilic component comprising at least 15 monomer units; and introducing the treatment fluid into at least a portion of a subterranean formation.

In another embodiment, the present invention provides a method comprising: providing a treatment fluid that comprises an aqueous base fluid, a viscoelastic surfactant, and an amphiphilic polymer, the amphiphilic polymer comprising an alkyl ethoxylate, wherein the treatment fluid does not comprise a substantial amount of a zwitterionic surfactant; and introducing the treatment fluid into at least a portion of a subterranean formation.

In another embodiment, the present invention provides a method comprising: providing a treatment fluid that comprises an aqueous base fluid, a viscoelastic surfactant, and an amphiphilic polymer, wherein the treatment fluid does not comprise a substantial amount of a zwitterionic surfactant and the amphiphilic polymer comprises: a hydrophobic component selected from the group consisting of: an alkyl group, a polybutadiene group, a polyisoprene group, a polystyrene group, a polyoxystyrene group, any derivative thereof, and any combination thereof; and a hydrophilic component selected from the group consisting of a polyethylene oxide group; a polyacrylic acid group, a polyethylacetate group, a dimethylacrylamide group, an n-isopropylacrylamide group, a polyvinylpyrrolidone group, a polyethyleneimine group, any derivative thereof, and any combination thereof; and introducing the treatment fluid into at least a portion of a subterranean formation.

In another embodiment, the present invention provides a method comprising: providing an aqueous base fluid, a viscoelastic surfactant, and an amphiphilic polymer, the amphiphilic polymer comprising a hydrophobic component, and a hydrophilic component comprising at least 15 monomer units; and mixing the aqueous base fluid, the viscoelastic surfactant, and the amphiphilic polymer together to form a treatment fluid.

In another embodiment, the present invention provides a treatment fluid comprising: an aqueous base fluid, a viscoelastic surfactant; and an amphiphilic polymer that comprises a hydrophobic component, and a hydrophilic component comprising at least 15 monomer units.

In another embodiment, the present invention provides a subterranean treatment additive comprising: a viscoelastic surfactant; and an amphiphilic polymer that comprises a hydrophobic component, and a hydrophilic component comprising at least 15 monomer units.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
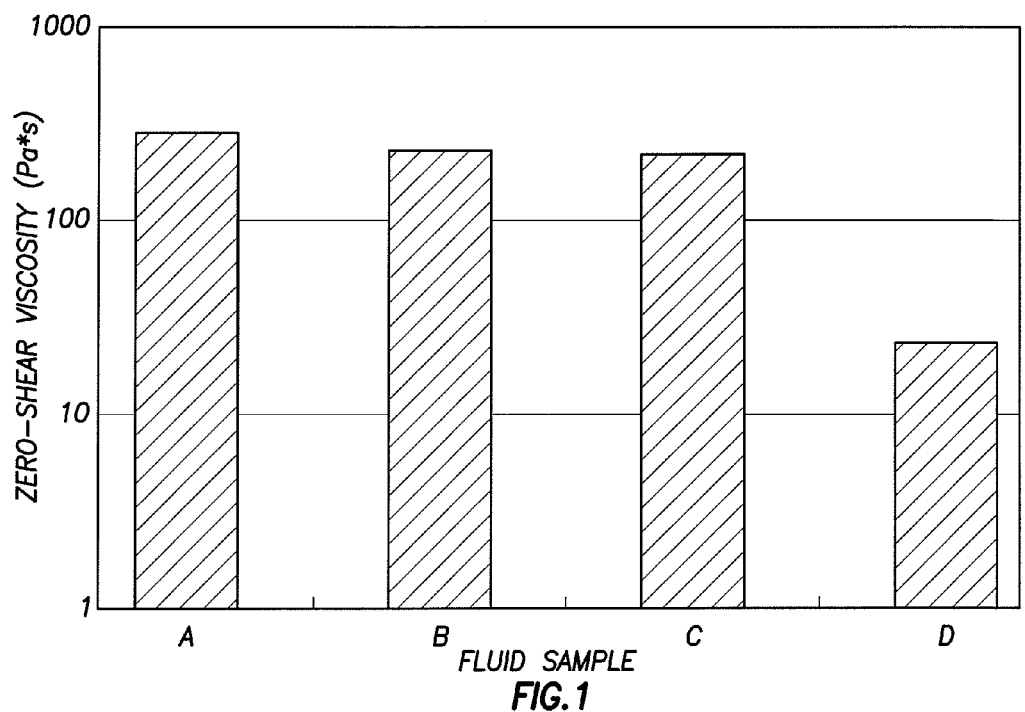
FIGS. 1-8 illustrate data regarding the zero-shear viscosity of certain viscoelastic surfactant fluids, including certain embodiments of the treatment fluids of the present invention.

The present invention relates to methods and compositions that may be useful in treating subterranean formations, and more specifically, to polymeric additives used with viscoelastic surfactants, fluids comprising such additives and viscoelastic surfactants, and associated methods of use.

The fluids and additives of the present invention generally comprise a viscoelastic surfactant and an amphiphilic polymer that comprises a hydrophobic component and a hydrophilic component. The term "viscoelastic surfactant" is defined herein to include any surfactant that imparts or is capable of imparting viscoelastic behavior to a fluid due, at least in part, to the association of surfactant molecules to form viscosifying micelles.

Among the many potential advantages of the present invention, the methods and compositions of the present invention may, among other things, enhance the viscoelasticity, stability, and/or other rheological properties of viscoelastic surfactant fluids, particularly at high temperatures and/or in brines or other high salinity conditions (greater than about 0.5 M). The methods of the present invention also may enhance the solubility of certain viscoelastic surfactants in a fluid, which may enhance the viscoelasticity, stability, and/or other rheological properties of the resulting viscoelastic surfactant fluid. Moreover, the methods and compositions of the present invention may facilitate the achievement of desired rheological properties in a fluid while utilizing lower concentrations of viscoelastic surfactant.

The viscoelastic surfactants used in the present invention may comprise any viscoelastic surfactant known in the art, any derivative thereof, or any combination thereof. These viscoelastic surfactants may be cationic, anionic, nonionic or amphoteric in nature. The viscoelastic surfactants may comprise any number of different compounds, including methyl ester sulfonates (e.g., as described in U.S. Pat. Nos. 7,299, 874, 7,159,659, and 7,303,019 and U.S. Published Application No. 2006/0183646, the relevant disclosures of which are incorporated herein by reference), hydrolyzed keratin (e.g., as described in U.S. Pat. No. 6,547,871, the relevant disclosure of which is incorporated herein by reference), sulfosuccinates, taurates, amine oxides, ethoxylated amides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), derivatives thereof, and combinations thereof. The term "derivative" is defined herein to include any compound that is made from one of the listed compounds, for example, by replacing one atom in the listed compound with another atom or group of atoms, rearranging two or more atoms in the listed compound, ionizing the listed compounds, or creating a salt of the listed compound.

Suitable viscoelastic surfactants may comprise mixtures of several different compounds, including but not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. Examples of suitable mixtures of an ethoxylated alcohol ether sulfate surfactant, an alkyl or alkene amidopropyl betaine surfactant, and an alkyl or alkene dimethylamine oxide surfactant are described in U.S. Pat. No. 6,063,738, the relevant disclosure of which is incorporated herein by reference. Examples of suitable aqueous solutions of an alpha-olefinic sulfonate surfactant and a betaine surfactant are described in U.S. Pat. No. 5,879,699, the relevant disclosure of which is incorporated herein by reference. Suitable viscoelastic surfactants also may comprise "catanionic" surfactant systems, which comprise paired oppositely-charged surfactants that act as counterions to each other and may form wormlike micelles. Examples of such catanionic surfactant systems include, but are not limited to sodium oleate (NaO)/octyl trimethylammonium chloride ($C_8$TAC) systems, stearyl trimethylammonium chloride ($C_{18}$TAC)/caprylic acid sodium salt (NaCap) systems, and cetyl trimethylammonium tosylate (CTAT)/sodium dodecylbenzenesulfonate (SDBS) systems.

Examples of commercially-available viscoelastic surfactants suitable for use in the present invention may include, but are not limited to, MIRATAINE BET-O 30™ (an oleamidopropyl betaine surfactant available from Rhodia Inc., Cranbury, N.J.), AROMOX APA-T (amine oxide surfactant available from Akzo Nobel Chemicals, Chicago, Ill.), ETHOQUAD O/12 PG™ (a fatty amine ethoxylate quat surfactant available from Akzo Nobel Chemicals, Chicago, Ill.), ETHOMEEN T/12™ (a fatty amine ethoxylate surfactant available from Akzo Nobel Chemicals, Chicago, Ill.), ETHOMEEN S/12™ (a fatty amine ethoxylate surfactant available from Akzo Nobel Chemicals, Chicago, Ill.), and REWOTERIC TEG™ (a tallow dihydroxyethyl betaine amphoteric surfactant available from Degussa Corp., Parsippany, N.J.).

The viscoelastic surfactant should be present in a fluid of the present invention in an amount sufficient to impart the desired viscosity (e.g., sufficient viscosity to divert flow, reduce fluid loss, suspend particulates, etc.) to the fluid. In certain embodiments, the viscoelastic surfactant may be present in the fluid in an amount in the range of from about 0.1% to about 20% by weight of the fluid. In certain embodiments, the viscoelastic surfactant may be present in an amount in the range of from about 0.5% to about 10% by weight of the fluid. In certain embodiments, the viscoelastic surfactant may be present in an amount in the range of from about 0.5% to about 3% by weight of the fluid.

The amphiphilic polymer(s) used in the present invention may comprise a variety of polymers known in the art that comprise a hydrophobic component and a hydrophilic component. For example, the amphiphilic polymer(s) may comprise a hydrophobic component, and a hydrophilic component comprising at least 15 monomer units. In certain embodiments, the hydrophilic component may be larger and, for example, have at least 20 monomer units. In certain embodiments, the hydrophilic component may be larger and, for example, have at least 50 monomer units. Examples of hydrophobic components that may be suitable for use include, but are not limited to alkyl groups, polybutadiene, polyisoprene, polystyrene, polyoxystyrene, any derivatives thereof, and any combinations thereof. Examples of hydrophilic components that may be suitable for use include, but are not limited to polyethylene oxide (PEO), polyacrylic acid (PAA), polyethylacetate, dimethylacrylamide (DMA), n-isopropylacrylamide (NIPAM), polyvinylpyrrolidone (PVP), polyethyleneimine (PEI), any derivatives thereof, and any combinations thereof. Examples of amphiphilic polymers that may be suitable for use include, but are not limited to polybutadiene-PEO, polystyrene-PEO, polystyrene-polyacrylic acid, polyoxystyrene-PEO, polystyrene-polyethylacetate, any derivatives thereof, and any combinations thereof. Other examples of amphiphilic polymers that may be suitable for use in the present invention include those that comprise units based on one or more of the following: acrylamides, vinyl alcohols, vinylpyrrolidones, vinylpyridines, acrylates, polyacrylamides, polyvinyl alcohols, polyvinylpyrrolidones, polyvinylpyridines, polyacrylates, polybutylene succinate, polybutylene succinate-co-adipate, polyhydroxybutyrate-valerate, polyhydroxybutyrate-covalerate, polycaprolactones, polyester amides, polyethylene terephthalates, sulfonated polyethylene terephthalate, polyethylene oxides, polyethylenes, polypropylenes, aliphatic aromatic copolyester, polyacrylic acids, polysaccharides (such as dextran or cellulose), chitins, chitosans, proteins, aliphatic polyesters, polylactic acids, poly(glycolides), poly(ε-caprolactones), poly(hydroxy ester ethers), poly(hydroxybutyrates), poly(anhydrides), polycarbonates, poly(orthoesters), poly(amino acids), poly(ethylene oxides), poly(propylene oxides), poly (phosphazenes), polyester amides, polyamides, polystyrenes, any derivative thereof, any copolymer, homopolymer, or terpolymer, or any blend thereof. In certain embodiments, the amphiphilic polymer may comprise a compound selected from the group consisting of hydroxyethyl acrylate, acrylamide and hydroxyethyl methacrylate.

In certain embodiments, the amphiphilic polymer(s) may comprise one or more alkyl ethoxylates. In certain embodiments, the alkyl ethoxylate may comprise an alkyl group, and an ethoxylate group having at least 15 oxyethylene units. In certain embodiments, the hydrophilic component may be larger and, for example, have at least 20 oxyethylene units. In certain embodiments, the hydrophilic component may be larger and, for example, have at least 50 oxyethylene units. Commercially available sources of such amphiphilic polymers that may be suitable for use in the present invention include, but are not limited to, certain detergents available under the tradename BRIJ®, such as BRIJ®-30 (comprises polyethylene glycol dodecyl ether), BRIJ®-35 (comprises polyoxyethyleneglycol dodecyl ether), BRIJ®-58 (comprises polyethylene glycol hexadecyl ether), BRIJ®-97 (comprises polyoxyethylene (10) oleyl ether), BRIJ®-98 (comprises polyoxyethylene (20) oleyl ether), and BRIJ®-700 (comprises polyoxyethylene (100) stearyl ether). Other commercially available sources of such amphiphilic polymers that may be suitable for use in the present invention include, certain detergents available under the tradename IGEPAL®.

The amphiphilic polymer should be present in a fluid of the present invention in an amount sufficient to impart the desired viscosity (e.g., sufficient viscosity to divert flow, reduce fluid loss, suspend particulates, etc.) to the fluid. In certain embodiments, the amphiphilic polymer may be present in the fluid in an amount in the range of from about 1 mol % to about 5 mol % based on the amount of the viscoelastic surfactant. In certain embodiments, the amphiphilic polymer may be present in the fluid in an amount in the range of from about 1 mol % to about 3 mol % based on the amount of the viscoelastic surfactant. In some instances, the presence of excessive amounts of amphiphilic polymer may reduce the stability of the viscoelastic surfactant fluid (e.g., may reduce the viscosity of the fluid). A person of skill in the art, with the benefit of this disclosure, will recognize the amount of amphiphilic polymer that may produce these effects in a particular application of the present invention, and determine when they should be avoided or employed. For example, certain embodiments of the present invention may comprise adding sufficient amounts of the amphiphilic polymer to reduce the viscosity of the fluid, among other purposes, to permit the fluid to leak off into a subterranean formation.

The fluids of the present invention generally comprise an aqueous base fluid. Suitable aqueous base fluids may comprise, among other things, fresh water, saltwater (e.g., water containing one or more salts dissolved therein), brine, seawater, and/or any combination thereof. Generally, the water may be from any source, provided that it does not contain components that might adversely affect the stability and/or performance of the fluids of the present invention. In certain embodiments, the density of the aqueous base fluid can be adjusted, among other purposes, to provide additional particle transport and suspension in the fluids of the present invention and/or to facilitate dissolving the viscoelastic surfactant into the aqueous base fluid. In certain embodiments, the pH of the aqueous base fluid may be adjusted (e.g., by a buffer or other pH adjusting agent), among other purposes, to reduce the viscosity of the fluid (e.g., activate a breaker or other additive). In these embodiments, the pH may be adjusted to a specific level, which may depend on, among other factors, the type(s) of viscoelastic surfactant(s), amphiphilic polymers, salts, and other additives included in the fluid. One of ordinary skill in the art, with the benefit of this disclosure, will recognize when such density and/or pH adjustments are appropriate.

The fluids used in methods of the present invention optionally may comprise any number of additional additives, including, but not limited to, salts, co-surfactants, acids, additional fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, dispersants, flocculants, $H_2S$ scavengers, $CO_2$ scavengers, oxygen scavengers, lubricants, viscosifiers, breakers, weighting agents, relative permeability modifiers, resins, particulate materials (e.g., proppant particulates), wetting agents, coating enhancement agents, and the like. In certain embodiments, the fluids and additives of the present invention may not comprise a substantial amount of a zwitterionic surfactant. A person skilled in the art, with the benefit of this disclosure, will recognize the types of additives that may be included in the fluids of the present invention for a particular application.

For example, the fluids of the present invention optionally may comprise one or more salts. The salts may be organic or inorganic. Examples of suitable organic salts include but are not limited to aromatic sulfonates and carboxylates (such as p-toluene sulfonate, naphthalene sulfonate), hydroxynaphthalene carboxylates, salicylate, phthalate, chlorobenzoic acid, salicylic acid, phthalic acid, 5-hydroxy-1-naphthoic acid, 6-hydroxy-1-naphthoic acid, 7-hydroxy-1-naphthoic acid, 1-hydroxy-2-naphthoic acid, 3-hydroxy-2-naphthoic acid, 5-hydroxy-2-naphthoic acid, 7-hydroxy-2-naphthoic acid, 1,3-dihydroxy-2-naphthoic acid, 3,4-dichlorobenzoate, trimethylammonium hydrochloride and tetramethylammonium chloride. Examples of suitable inorganic salts include water-soluble potassium, sodium, and ammonium salts, (such as sodium chloride, potassium chloride, and ammonium chloride), calcium chloride, calcium bromide, magnesium chloride and zinc halide salts. Examples of viscoelastic surfactant fluids comprising salts suitable for use in the present invention are described in U.S. patent application Ser. No. 10/800,478, the relevant disclosure of which is incorporated herein by reference. Any combination of the salts listed above also may be included in the fluids of the present invention.

The optional salt may be present in any practicable amount. In certain embodiments, the salt may be present in an amount in the range of from about 0.1% to about 30% by weight of the fluid. In certain embodiments, the salt may be present in an amount in the range of from about 0.1% to about 10% by weight of the fluid. The type(s) and amount of salts suitable in a particular application of the present invention may depend upon a variety of factors, such as the type(s) of viscoelastic surfactant(s) present in the fluid, the composition of the aqueous-base fluid, the temperature of the fluid and/or the region of desired use, and the like. In certain embodiments of the present invention, the aqueous base fluid may comprise a brine that already includes a certain amount of salt. In these embodiments, additional salts may not be desired, or it may be desirable to remove salt from or add further salt to the brine in the preparation and/or use of a fluid of the present invention. A person of ordinary skill, with the benefit of this disclosure, will recognize when to include a salt in a particular application of the present invention, as well as the appropriate type and amount of salts to include.

In certain embodiments, the methods of the present invention generally comprise: providing an aqueous base fluid, a viscoelastic surfactant, and an amphiphilic polymer that comprises (a) a hydrophobic component comprising an alkyl group, and (b) a hydrophilic component comprising an ethoxylate having at least 20 oxyethylene units; and mixing the aqueous base fluid, the viscoelastic surfactant, and the amphiphilic polymer together to form a fluid of the present invention. The fluids of the present invention and/or any component thereof (e.g., the amphiphilic polymer) may be provided in any form that is suitable for the particular application of the present invention. In certain embodiments, the viscoelastic surfactant and/or amphiphilic polymer may be provided as a liquid and/or solid additive that is admixed or incorporated at any point prior to and/or during use of the fluid. For example, in certain embodiments, the amphiphilic polymer may be added to a fluid that is already present in a portion of a subterranean formation. The different components of the fluids of the present invention may be provided or incorporated together (e.g., in the same additive or fluid), or they may be provided or incorporated into a fluid as separate additives. Where they are provided or incorporated into a fluid separately, the different components may be provided or incorporated simultaneously, or certain components may be provided or incorporated at some point in time before or after the other components are provided or incorporated. The fluids of the present invention and/or any component thereof may be prepared at a job site, or they may be prepared at a plant or facility prior to use, and may be stored for some period of time prior to use. In certain embodiments, the preparation of these fluids of the present invention may be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

In certain embodiments, the methods of the present invention comprise: providing a treatment fluid that comprises an aqueous base fluid, a viscoelastic surfactant, and an amphiphilic polymer that comprises (a) a hydrophobic component comprising an alkyl group, and (b) a hydrophilic component comprising an ethoxylate having at least 15 oxyethylene units; and introducing the treatment fluid into at least a portion of a subterranean formation. In these methods, the treatment fluid (and/or the separate components thereof) may be introduced into a portion of a subterranean formation by any means known in the art.

The methods and treatment fluids of the present invention may be used during or in preparation for any subterranean operation wherein a fluid may be used. Suitable subterranean operations may include, but are not limited to, preflush treatments, afterflush treatments, drilling operations, hydraulic fracturing treatments, sand control treatments (e.g., gravel packing), acidizing treatments (e.g., matrix acidizing or fracture acidizing), "frac-pack" treatments, well bore clean-out treatments, and other operations where a treatment fluid of the present invention may be useful. For example, in certain embodiments, the present invention provides fluids that comprise an aqueous base fluid, a viscoelastic surfactant, an amphiphilic polymer that comprises (a) a hydrophobic component comprising an alkyl group, and (b) a hydrophilic component comprising an ethoxylate having at least 15 oxyethylene units, and, in certain embodiments, a plurality of proppant particulates. In certain embodiments, a treatment fluid of the present invention may be used in a method of fracturing a subterranean formation, wherein a treatment fluid of the present invention is introduced into the subterranean formation at or above a sufficient hydraulic pressure to create or enhance one or more cracks, or "fractures," in the subterranean formation. "Enhancing" one or more fractures in a subterranean formation, as that term is used herein, is defined to include the extension or enlargement of one or more natural or previously created fractures in the subterranean formation. This may, among other things, form conductive channels in the subterranean formation through which fluids (e.g., oil, gas, etc.) may flow to a well bore penetrating the subterranean formation.

To facilitate a better understanding of the present invention, the following examples of certain aspects of some embodiments are given. In no way should the following examples be read to limit, or define, the entire scope of the invention.

EXAMPLES

Example 1A

A fluid was prepared comprising a 1.5% by weight aqueous solution of a cetyl trimethylammonium tosylate (CTAT)/sodium dodecylbenzenesulfonate (SDBS) (97:3 weight ratio) surfactant system, and the zero-shear viscosity of the fluid was measured using an Physica MCR501 rheometer (manufactured by Anton Paar GmbH) at 70° F. and ambient pressure. A certain amount of an amphiphilic polymer (BRIJ-35 or BRIJ-700) was then added to 3 different samples of that fluid, and the zero-shear viscosity of each fluid sample with the polymer added was measured at the same conditions. The types and amounts (by weight of the surfactant system) of amphiphilic polymer added to each fluid and the resulting viscosities are listed in Table 1 and depicted in FIG. 1.

TABLE 1

| Fluid Sample No. | Composition | Zero shear viscosity (Pa * s) |
| --- | --- | --- |
| A | CTAT/SDBS surfactant | 282 |
| B | CTAT/SDBS surfactant + 1 mol % BRIJ-35 | 231 |
| C | CTAT/SDBS surfactant + 1 mol % BRIJ-700 | 215 |
| D | CTAT/SDBS surfactant + 3 mol % BRIJ-700 | 23 |

Example 1B

Figure 2:
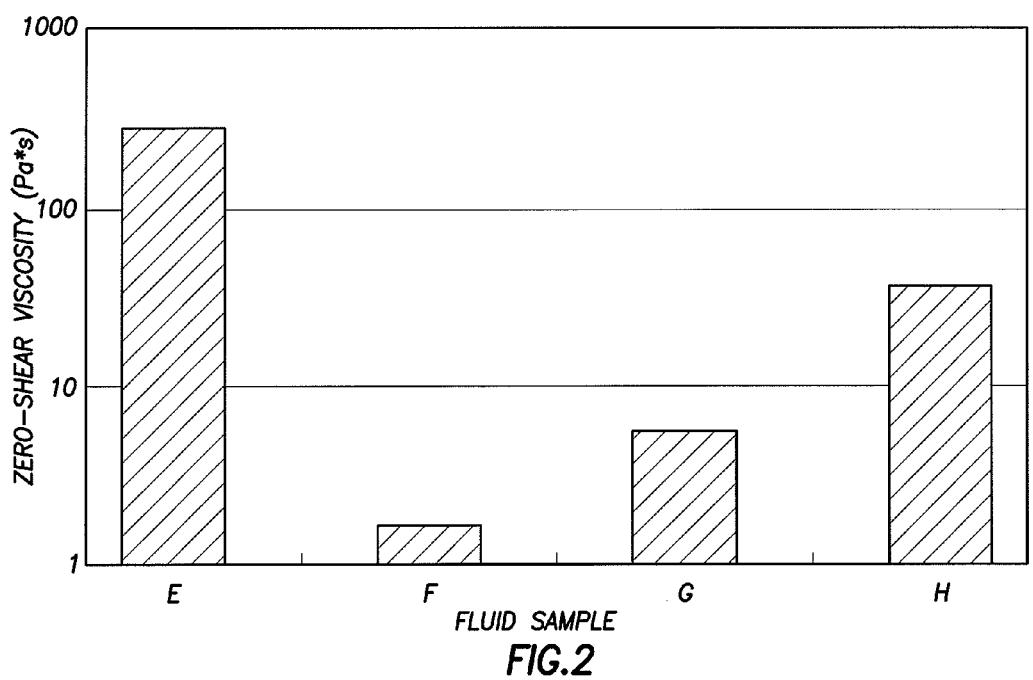

A second fluid was prepared using the same surfactant system and concentration described in Example 1A in an aqueous 0.7M solution of sodium bromide (NaBr), and its zero-shear viscosity was measured. An amphiphilic polymer (BRIJ-700) was added to 2 different samples of that fluid (1 mol % and 3 mol % by weight of the surfactant system, respectively), and the zero-shear viscosity of each fluid sample with the polymer added was measured. The resulting viscosities are listed in Table 2 and are depicted in FIG. 2, along with the zero-shear viscosity of the initial fluid from Example 1A without polymer or sodium bromide for comparison.

TABLE 2

| Fluid Sample No. | Composition | Zero shear viscosity (Pa * s) |
| --- | --- | --- |
| E | CTAT/SDBS surfactant | 282 (from Example 1A) |
| F | 0.7M NaBr + CTAT/SDBS surfactant | 1.7 |
| G | 0.7M NaBr + CTAT/SDBS surfactant + 1 mol % BRIJ-700 | 5.8 |
| H | 0.7M NaBr + CTAT/SDBS surfactant + 3 mol % BRIJ-700 | 37 |

Example 1C

Figure 3:
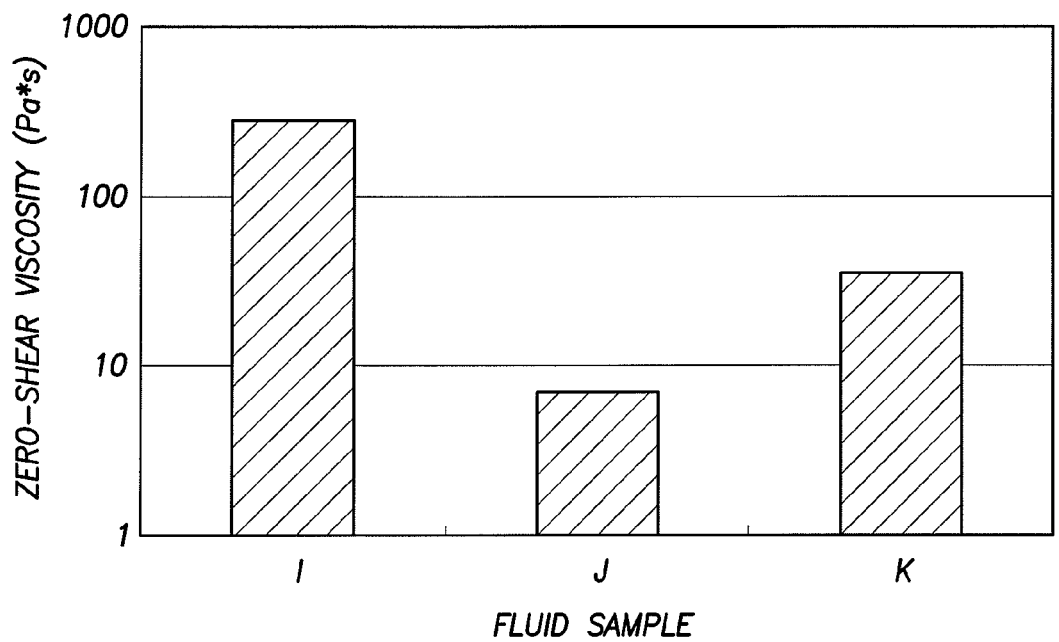

A third fluid was prepared using the same surfactant system and concentration described in Example 1A in an aqueous 1M solution of sodium bromide (NaBr). An amphiphilic polymer (BRIJ-700) was added to 2 different samples of that fluid (1 mol % and 3 mol % by weight of the surfactant system, respectively), and the zero-shear viscosity of each fluid sample with the polymer added was measured. The resulting viscosities are listed in Table 3 and are depicted in FIG. 3, along with the zero-shear viscosity of the initial fluid from Example 1A without polymer or sodium bromide for comparison.

TABLE 3

| Fluid Sample No. | Composition | Zero shear viscosity (Pa * s) |
|---|---|---|
| I | CTAT/SDBS surfactant | 282 (from Example 1A) |
| J | 1M NaBr + CTAT/SDBS surfactant + 1 mol % BRIJ-700 | 6.8 |
| K | 1M NaBr + CTAT/SDBS surfactant + 3 mol % BRIJ-700 | 35 |

Example 1D

Figure 4:
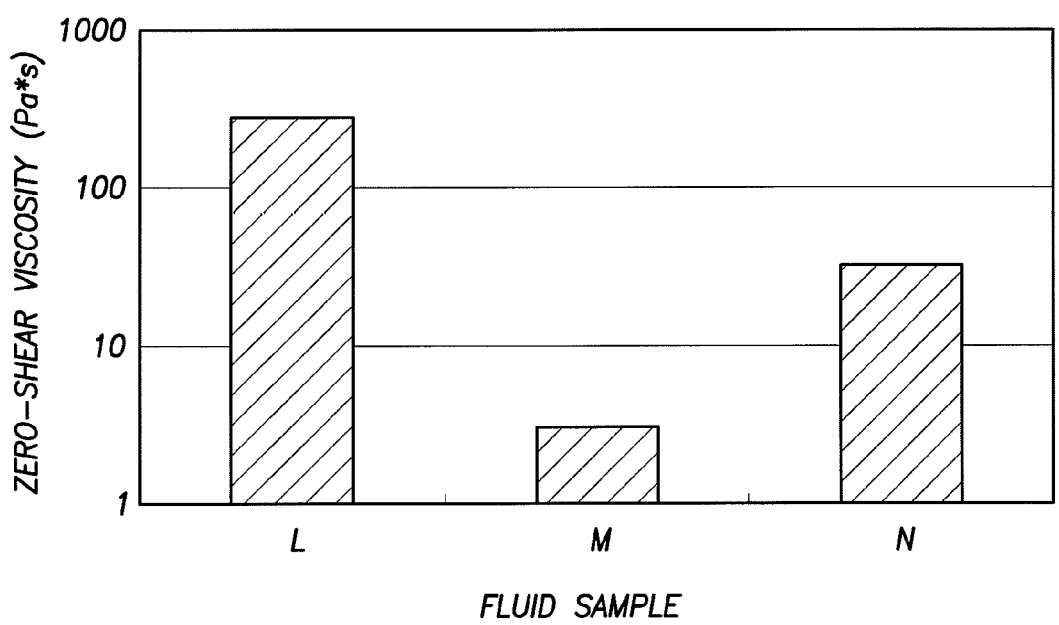

A fourth fluid was prepared using the same surfactant system and concentration described in Example 1A in an aqueous 2M solution of sodium bromide (NaBr). An amphiphilic polymer (BRIJ-700) was added the fluid (3 mol % by weight of the surfactant system), and the zero-shear viscosity of the fluid with the polymer added was measured. The resulting viscosities are listed in Table 4 and are depicted in FIG. 4, along with the zero-shear viscosity of the initial fluid from Example 1A without any polymer or sodium bromide for comparison.

TABLE 4

| Fluid Sample No. | Composition | Zero shear viscosity (Pa * s) |
|---|---|---|
| L | CTAT/SDBS surfactant | 282 (from Example 1A) |
| M | 2M NaBr + CTAT/SDBS surfactant | 3.1 |
| N | 2M NaBr + CTAT/SDBS surfactant + 3 mol % BRIJ-700 | 33 |

Thus, Examples 1A-1D illustrate that the methods and additives of the present invention may enhance the rheology of certain viscoelastic surfactant fluids.

Example 2A

Figure 5:
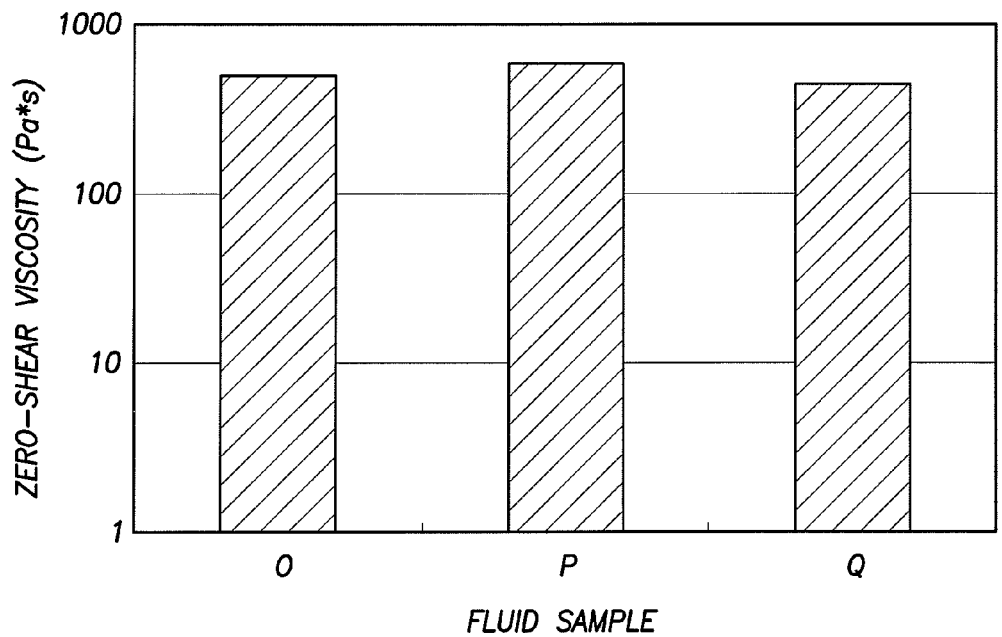

A fluid was prepared comprising a 3% by weight aqueous solution of a cetyl trimethylammonium tosylate (CTAT)/sodium dodecylbenzenesulfonate (SDBS) (97:3 weight ratio) surfactant system, and the zero-shear viscosity of the fluid was measured using the same methods and parameters described in Example 1A. An amphiphilic polymer (BRIJ-35 or BRIJ-700) was then added to 2 different samples of that fluid (1 mol % by weight of the surfactant system in each), and the zero-shear viscosity of each fluid sample with the polymer added was measured. The resulting viscosities are listed in Table 5 and depicted in FIG. 5.

TABLE 5

| Fluid Sample No. | Composition | Zero shear viscosity (Pa * s) |
|---|---|---|
| O | CTAT/SDBS surfactant | 488 |
| P | CTAT/SDBS surfactant + 1 mol % BRIJ-35 | 436 |
| Q | CTAT/SDBS surfactant + 1 mol % BRIJ-700 | 573 |

Example 2B

Figure 6:
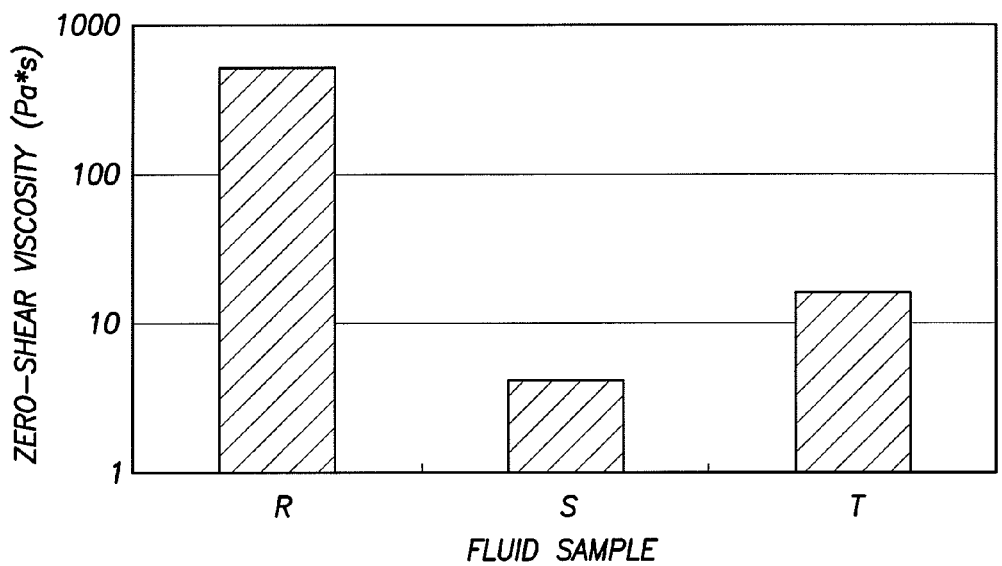

A second fluid was prepared using the same surfactant system and concentration described in Example 2A in an aqueous 0.7M solution of sodium bromide (NaBr), and its zero-shear viscosity was measured. An amphiphilic polymer (BRIJ-700) was added to the fluid (1 mol % by weight of the surfactant system), and the zero-shear viscosity of the fluid with the polymer added was measured. The resulting viscosities are listed in Table 6 and are depicted in FIG. 6, along with the zero-shear viscosity of the initial fluid from Example 2A without polymer or sodium bromide for comparison.

TABLE 6

| Fluid Sample No. | Composition | Zero shear viscosity (Pa * s) |
|---|---|---|
| R | CTAT/SDBS surfactant | 488 |
| S | 0.7M NaBr + CTAT/SDBS surfactant | 4.3 |
| T | 0.7M NaBr + CTAT/SDBS surfactant + 1 mol % BRIJ-700 | 16.7 |

Thus, Examples 2A and 2B illustrate that the methods and additives of the present invention may enhance the rheology of certain viscoelastic surfactant fluids.

Example 3A

Figure 7:
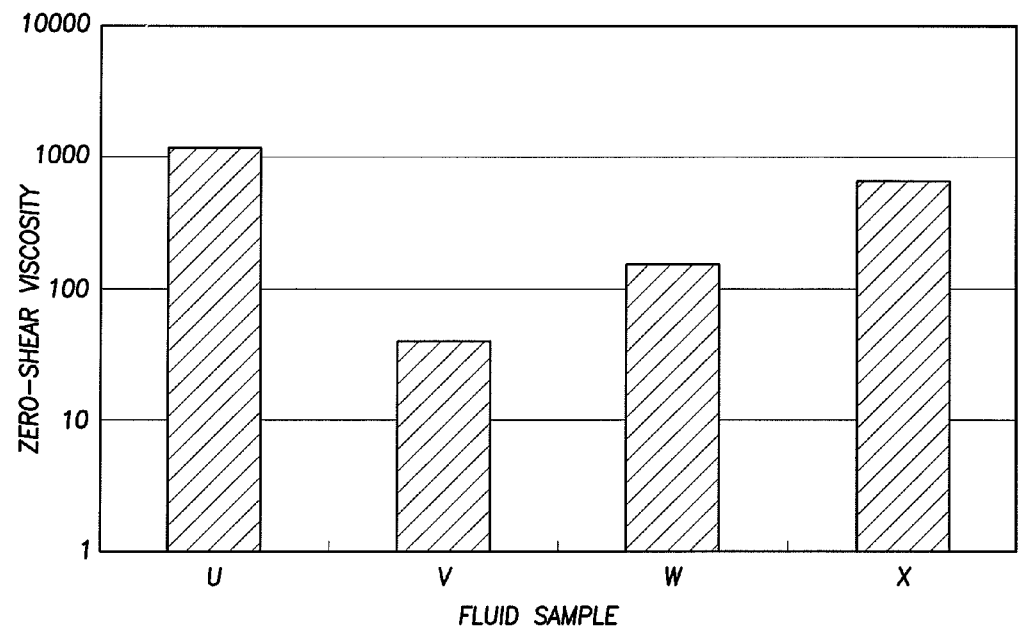

A fluid was prepared comprising a 3% by weight aqueous solution of a sodium oleate (NaO)/octyl trimethylammonium chloride ($C_8$TAC) (7:3 weight ratio) surfactant system, and the zero-shear viscosity of the fluid was measured using the same methods and parameters described in Example 1A. An amphiphilic polymer (BRIJ-30, BRIJ-35, or BRIJ-700) was then added to 3 different samples of that fluid (1 mol % by weight of the surfactant system in each), and the zero-shear viscosity of each fluid sample with the polymer added was measured. The resulting viscosities are listed in Table 7 and depicted in FIG. 7.

TABLE 7

| Fluid Sample No. | Composition | Zero shear viscosity (Pa * s) |
|---|---|---|
| U | NaO/$C_8$TAC surfactant | 1180 |
| V | NaO/$C_8$TAC surfactant + 1 mol % BRIJ-30 | 41 |
| W | NaO/$C_8$TAC surfactant + 1 mol % BRIJ-35 | 154 |
| X | NaO/$C_8$TAC surfactant + 1 mol % BRIJ-700 | 629 |

Example 3B

Figure 8:
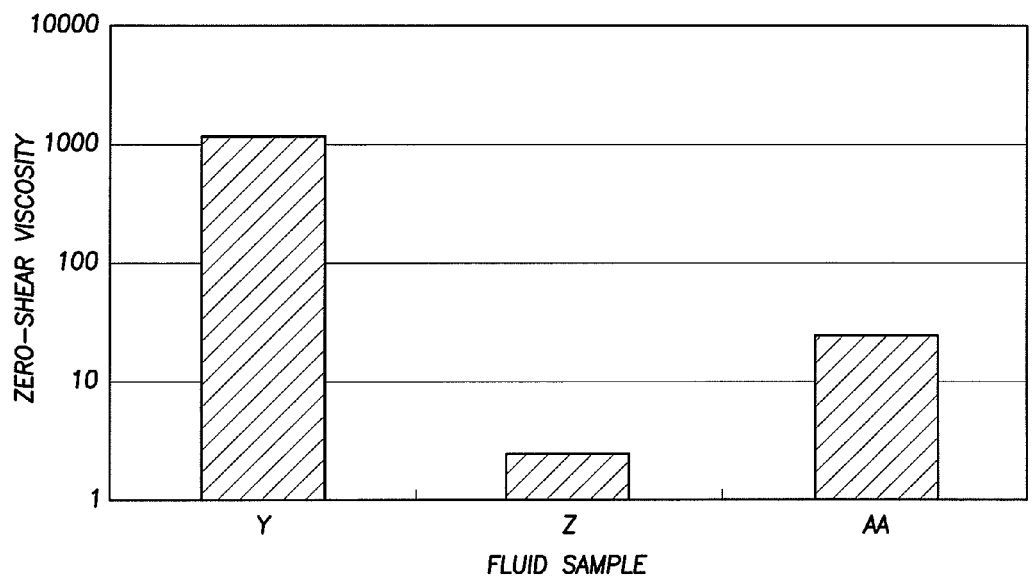

A second fluid was prepared using the same surfactant system and concentration described in Example 3A in an aqueous 0.15M solution of sodium bromide (NaBr), and its zero-shear viscosity was measured. An amphiphilic polymer (BRIJ-700) was added to the fluid (1 mol % by weight of the surfactant system), and further sodium bromide was added to bring the solution to a 0.2M NaBr concentration. The zero-shear viscosity of the fluid with the polymer and additional NaBr was measured. The resulting viscosities are listed in Table 8 and are depicted in FIG. 8, along with the zero-shear viscosity of the initial fluid from Example 3A without polymer or sodium bromide for comparison.

TABLE 8

| Fluid Sample No. | Composition | Zero shear viscosity (Pa * s) |
| --- | --- | --- |
| Y | NaO/C$_8$TAC surfactant | 1180 |
| Z | 0.15M NaBr + NaO/C$_8$TAC surfactant | 2.4 |
| AA | 0.2M NaBr + NaO/C$_8$TAC surfactant + 1 mol % BRIJ-700 | 24 |

Thus, Examples 3A and 3B illustrate that the methods and additives of the present invention may enhance the rheology of certain viscoelastic surfactant fluids.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
providing a treatment fluid that comprises an aqueous base fluid, a viscoelastic surfactant, and an amphiphilic polymer, the amphiphilic polymer comprising:
 a hydrophobic component, and
 a hydrophilic component itself comprising at least 15 monomer units;
wherein the amphiphilic polymer comprises: a hydrophobic component selected from the group consisting of polybutadiene, polyisoprene, polystyrene, and combinations thereof, and,
a hydrophilic component selected from the group consisting of an ethoxylate, polyethylene oxide (PEO), polyacrylic acid (PAA), polyethylacetate, dimethylacrylamide (DMA), n-isopropylacrylamide (NIPAM), polyvinylpyrrolidone (PVP), polyethyleneimine (PEI), derivatives thereof, and combinations thereof; and, introducing the treatment fluid into at least a portion of a subterranean formation.

2. The method of claim 1 wherein the amphiphilic polymer comprises an alkyl ethoxylate comprising at least 15 oxyethylene units.

3. The method of claim 1 wherein the aqueous base fluid comprises at least one brine.

4. The method of claim 1 wherein the viscoelastic surfactant comprises at least one surfactant selected from the group consisting of: a methyl ester sulfonate, a hydrolyzed keratin, a sulfosuccinate, a taurate, an amine oxide, an ethoxylated amide, an alkoxylated fatty acid, an alkoxylated alcohol, an ethoxylated fatty amine, an ethoxylated alkyl amine, a betaine, a modified betaine, an alkylamidobetaine, a quaternary ammonium compound, any derivative thereof, and any combination thereof.

5. The method of claim 1 wherein the treatment fluid does not comprise a zwitterionic surfactant.

6. The method of claim 1 wherein the viscoelastic surfactant comprises a catanionic surfactant system.

7. The method of claim 1 wherein the viscoelastic surfactant is present in the treatment fluid in an amount of from about 0.1% to about 20% by weight of the treatment fluid.

8. The method of claim 1 wherein the amphiphilic polymer is present in the treatment fluid in an amount of from about 1 mol % to about 5 mol % based on the amount of the viscoelastic surfactant.

9. The method of claim 1 wherein the treatment fluid further comprises at least one salt.

10. The method of claim 1 wherein introducing the treatment fluid into at least a portion of a subterranean formation comprises introducing the treatment fluid into the subterranean formation at or above a pressure sufficient to create or enhance one or more cracks or fractures in at least a portion of the subterranean formation.

11. A method comprising:
providing a treatment fluid that comprises an aqueous base fluid, a viscoelastic surfactant, and an amphiphilic polymer, the amphiphilic polymer comprising a hydrophobic component and a hydrophilic component:
 the hydrophilic component comprising at least 15 monomer units;
a hydrophobic component selected from the group consisting of polybutadiene, polyisoprene, and combinations thereof, and,
a hydrophilic component selected from the group consisting of an polyethylacetate, dimethylacrylamide (DMA), n-isopropylacrylamide (NIPAM), polyethyleneimine (PEI), and combinations thereof; and, wherein the treatment fluid does not comprise a zwitterionic surfactant; and introducing the treatment fluid into at least a portion of a subterranean formation.

12. The method of claim 11 wherein the aqueous base fluid comprises at least one brine.

13. The method of claim 11 wherein the alkyl ethoxylate comprises at least 15 oxyethylene units.

\* \* \* \* \*